INVENTOR.
DAVID KRECHMAN
BY
Herzig, Walsh & Blackham
ATTORNEYS

INVENTOR.
DAVID KRECHMAN
BY
Herzig, Walsh & Blackham
ATTORNEYS

INVENTOR.
DAVID KRECHMAN
BY
Herzig, Walsh & Blackham
ATTORNEYS

INVENTOR.
DAVID KRECHMAN
BY
Herzig, Walsh & Blackham
ATTORNEYS

United States Patent Office 3,486,675
Patented Dec. 30, 1969

3,486,675

MAGNETIC TAPE CARTRIDGE PLAYER WITH PIVOTED PINCH ROLL CARTRIDGE HOLDING MEANS

David Krechman, 329 S. McCarty Drive,
Beverly Hills, Calif. 90212

Filed June 24, 1966, Ser. No. 560,337
Int. Cl. B65h *17/22*
U.S. Cl. 226—101 2 Claims

ABSTRACT OF THE DISCLOSURE

The invention is an improvement in sound reproducing instruments particularly tape players which receive tape cartridges. The instrument has a pinch roller which can be moved into a position into a tape cartridge to hold the tape against a capstan. The instrument is also configurated to receive a tape cartridge that has its own pinch roller in a position where this pinch roller holds the tape against the capstan of the instrument. The pinch roller of the instrument can be moved into a position to engage a tape cartridge having its own pinch roller to hold the tape cartridge in position.

This invention relates to improvements in sound reproducing instruments which employ endless magnetic tapes. The instruments may be simply tape players or recorder play-back type instruments. The improvements are in instruments of this type which use tape cartridges having mounted in them an endless magnetic tape. The improvements reside primarily in two particular areas. The invention will be described herein in an exemplary form as applied in a tape player. The first area referred to has to do with adapting the instrument, i.e., the tape player, to the use with it, of different types of tape cartridges. The second area has to do with the adaptation of the machine to use with magnetic tapes having a plurality of sound tracks thereon. Tapes commonly in use provide for stereo reproduction, that is, two magnetic tracks on the tape are reproduced simultaneously. Conventionally, more than one program is recorded on each stereo tape. There may be four magnetic tracks providing for two stereo recordings or programs. Or there may be more than four tracks, such as eight, providing four stereo recordings or programs. The invention herein provides improvements in the player adapting it for use with cartridges, that is, magnetic tapes, having various numbers of programs or stereo recordings thereon, such as two or more. Conventionally, the recorder head is adjusted in position relative to the tape to adjust from one stereo program to another. The improvements of this invention in this respect reside in improved and simplified means for adjusting the reproducing or play-back head from one pair of tracks to another on the tape.

Referring again to the tape cartridges, a typical construction of such a cartridge is one having an opening in the housing thereof into which a pinch roll is moved when the cartridge is inserted into the machine, that is, the reproducing instrument. The pinch roll in the machine is mounted so that it can be manually rotated up through the opening in the cartridge housing into a position in which the tape is pinched between the pinch roll and the capstan of the machine for driving the tape. Such a construction of pinch roll and cartridge is shown in Patent No. 2,876,005. The machine or instrument of this invention is adaptable for use with tape cartridges of this type.

Recently, another type of tape cartridge has become available in which the pinch roll is provided in the tape cartridge housing itself. The machine or instrument of this invention is adaptable for use with this type of cartridge as well. Patent No. 2,778,637 shows one form of tape cartridge having a pinch roll mounted within the cartridge housing itself.

The improvements of this invention may be adapted in tape players which are otherwise conventional. Such tape players normally are provided with manual controls, including controls for starting and stopping and for operation of the movable pinch roll, if there is one in the machine. In the herein invention, the adaptation of the machine for use with different types of tape cartridges includes the utilization of the existing manual controls on the machine. With respect to the multiple positioning of the play-back head for different programs, however, a button control is preferably provided.

With respect to the adaptation of the machine to use with tapes having multiple stereo programs recorded thereon, the form of the invention, as described herein, is a preferred form of providing for the multiple positions of the play-back head. Preferably, this takes the form of a lifting cam having dwells capable of positioning the play-back head. The dwells on a face of the cam, which is also a ratchet wheel, is operable by a pawl which is driven by an electro-magnet. Thus, simply by energizing the electro-magnet in response to a push button, the pawl and ratchet mechanism is actuated to rotate the cam whereby to position the play-back head in its various positions. That is, adjustment from one program to another on the tape may be made simply by pressing a button.

In the light of the foregoing, the primary object of the invention is to provide a reproducing machine or tape player adapted for use with various different types of tape cartridges. Particularly, it is an object to adapt a tape player to use with cartridges of the type having a pinch roll in them, as well as to cartridges of the type not having a pinch roll in them.

A further object is to adapt and provide tape players with means whereby tape cartridges of different types may be inserted and held in the machine. It is a corollary of this object to achieve this result using, primarily, manual controls originally provided with the machine.

Another object of the invention is to provide improvements in reproducing machines, such as tape players and the like, adapting them for use with magnetic tapes having multiple stereo recordings or programs recorded thereon. It is the intention of this object to provide adaptations whereby the tape player is adapted for use with tapes having two or more stereo recordings thereon.

A further object is to provide means for realizing the foregoing object comprising mechanism for adjusting the position of the play-back head, which is of a positive, but simplified, construction including an electro-magnet operable in response to a push button.

A further object is to provide means for accomplishing the foregoing object wherein the means for adjusting the position of the play-back head is in the form of a cam having dwells on a face thereof, the cam also being in the form of a ratchet wheel operable by a ratchet activated bv the electro-magnet.

Further objects and additional advantages of the invention will become apparent from the following detailed description and annexed drawings wherein.

Figure 1:
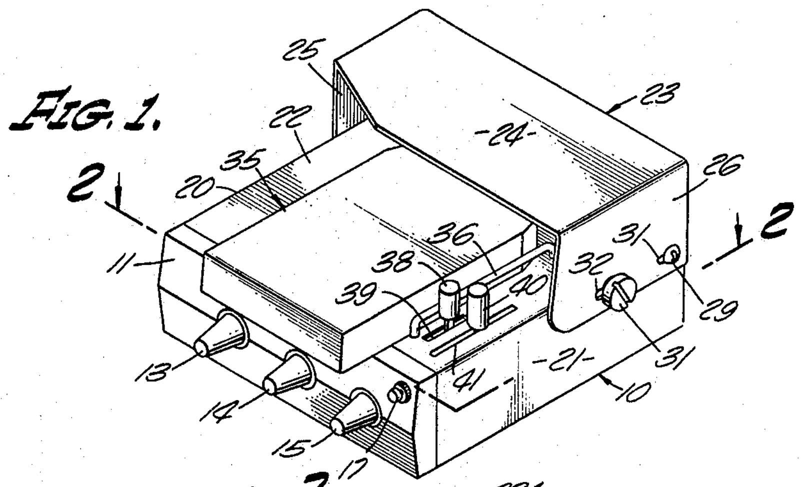
FIGURE 1 is a prospective view of a tape player having the improvements of the invention embodied therein, and showing it adapted to use with one form of tape cartridge.

FIGURE 1 is an external view of a tape player having the improvements of the invention embodied therein. It comprises a generally rectilinear housing 10 having a bevelled front panel 11 having tapered knobs 13, 14 and 15 thereon. These knobs are tone, separation and loudness controls. Numeral 17 designates a button for adjusting or shifting from one recorded program to another, as will be described more in detail presently. The housing or chassis 10 has side walls 20 and 21 and a top wall 22. Mounted over the back part of the chassis 10 is a shroud 23 having a top wall 24 and end walls 25 and 26, which are attached to the side walls 20 and 21 of the chassis. The attachment may be by way of a screw 29 extending through a slot 30 and a second screw 31, the periphery of which is knurled, extending through a slot 32. A similar attachment is provided on the opposite side of the shroud 23, identified by similar numerals primed.

Numeral 35 designates a tape cartridge shown in inserted position in the tape player. The cartridge is adjacent to a guide rail 36 on the top surface of the chassis 10. Numeral 38 designates an upright control lever or knob operable in a slot 39. Numeral 40 designates a second upright control lever or knob operable in a slot 41. The lever 40, as will be described hereinafter, operates a movable pinch roll in the machine. The lever 38, as will be described, operates spring detent means for holding the tape cartridge of the type shown in the machine, and this lever may also operate a switch to start and stop the machine. It will be understood that the lever 40 is not used when that type of tape cartridge that has its own pinch roll embodied in it is used with the machine.

Figure 2:
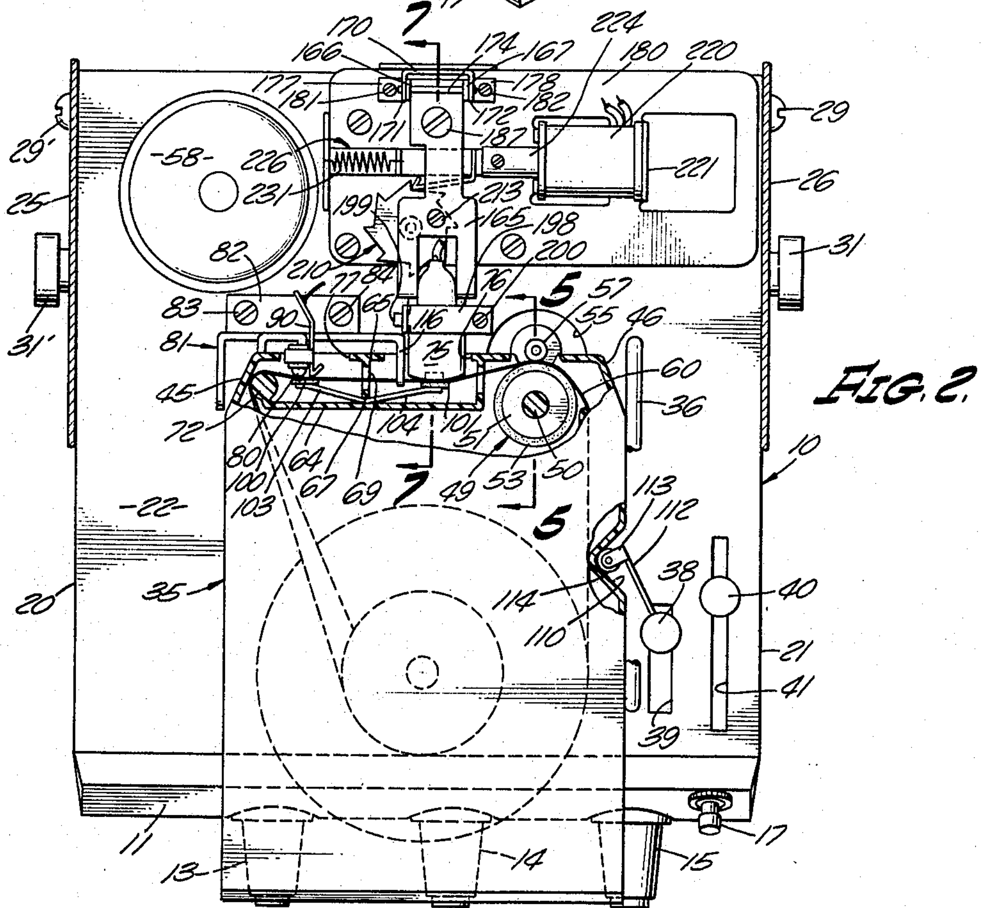
FIGURE 2 is a sectional view taken along the line 2—2 of FIGURE 1.
Figures 7, 8:
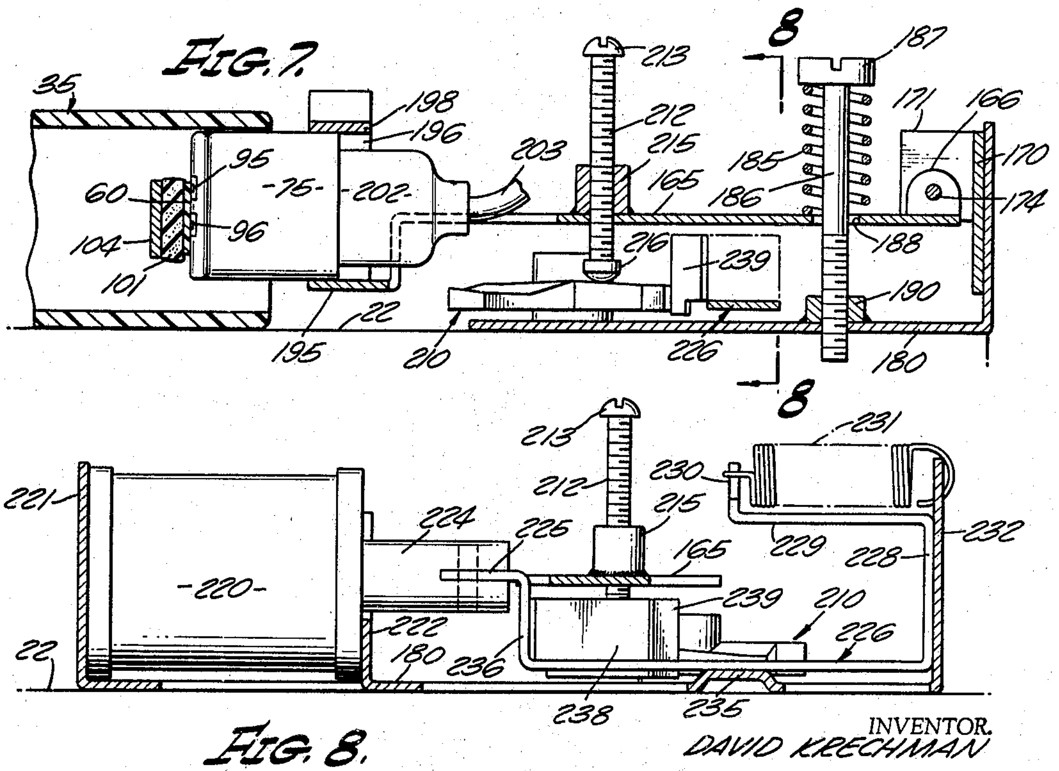
FIGURE 7 is a sectional view taken along the line 7—7 of FIGURE 2.
FIGURE 8 is a view taken along the line 8—8 of FIGURE 7.

FIGURE 2 is a top view of the machine taken along the line 2—2 of FIGURE 1 showing the mechanism underneath the shroud 23 and showing the tape cartridge 35 partly broken away. This figure, along with FIGURES 7 and 8, show the mechanism whereby the play-back head is adjusted or shifted from one program to another. The tape cartridge and its manner of insertion will be described first, however.

The tape cartridge 35 may be of conventional construction. It is of generally flat rectilinear construction having bevelled inner corners as designated at 45 and 46. In position, it is adjacent to the guide rail 36, as shown. The tape is in the form of an endless belt wound on a tape reel or roller carried on a spindle within the cartridge, as shown in outline. In the upper corner of the housing of the tape cartridge there is mounted a pinch roll 49. It is mounted on a central spindle 50 and comprises a cylindrical roll 51 made of any suitable material having a rubber rim or tire, as designated at 53. (See FIGURE 5.) The pinch roll is mounted adjacent to an opening 55 in the top of the housing of the tape cartridge. When the tape cartridge is in position, this opening 55 is adjacent to the driving capstan of the tape player, as designated at 57, the capstan being driven by a motor or driving means 58. The opening 55 partially straddles the capstan 57 so that it comes into engagement with the tire 53 of the pinch roll 49 with the tape 60 held therebetween in driving relationship.

Figure 3:
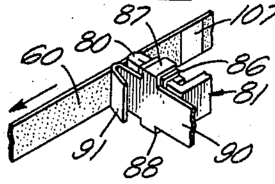
FIGURE 3 is a detail view showing the contacts which are bridged by metallic coating on the magnetic tape.

In the upper part of the housing of the cartridge 35 there is a partition 64 forming subhousings between itself and the end wall 65 of the cartridge. Numeral 67 designates a partition which is transverse to the partition 64 and having an opening 69 in it. In one end of the subhousing formed by partition 64 there is an integral transverse rod, as designated at 72, formed as a part of the cartridge. The tape 46 passes over this guide rod or stem and then passes transversely, as shown, and then between the pinch roll 49 and capstan 57. The play-back or pick-up head is designated at 75. When the cartridge 35 is in its inserted position, as shown, the play-back head 75 protrudes through an opening 76 in the tape cartridge into the subhousing provided by partition 64. The cartridge has another opening in the end wall, as designated at 77, and when it is in its inserted position, a pair of contacts extend into the cartridge through this opening. One of these contacts, as designated at 80 (see FIGURE 3), is formed as an extension from a metal frame 81 having a horizontal foot or flange part 82, which is attached to the top surface 22 of the tape player by screws, as shown at 83 and 84. The end partof contact 80 is bent back on itself, as shown in FIGURE 3. Wrapped around this bent-back contact part is insulation material 86. Clamped around the insulation material are the clamping fingers 87 and 88 extending from a metal contact strip 90 having a return bent end part as designated at 91. As shown in FIGURE 2, the tape 60 passes in contacting engagement with the contact members 80 and 91 and with the end of the playback head 75, so as to engage the electrodes in the end face thereof, as designated at 95 and 96 in FIGURE 7. Numerals 100 and 101 designate a pair of soft pads which are on the end of spring arms 103 and 104 held in position by the partition member 67, as shown in FIGURE 2. The tape 60 passes between the pad 100 and the contacts 80 and 91 and between the pad 101 and the electrodes in the face of play-back head 75. Between recorded programs on the tap 60, there are provided the small areas of metallic coating, as designated at 107 in FIGURE 3. When these areas pass contacts 80 and 91, they bridge the contacts completing a circuit for purposes of shifting from one program to another, as will be described more in detail presently.

Figures 9, 10, 11, 12, 13, 14, 15:
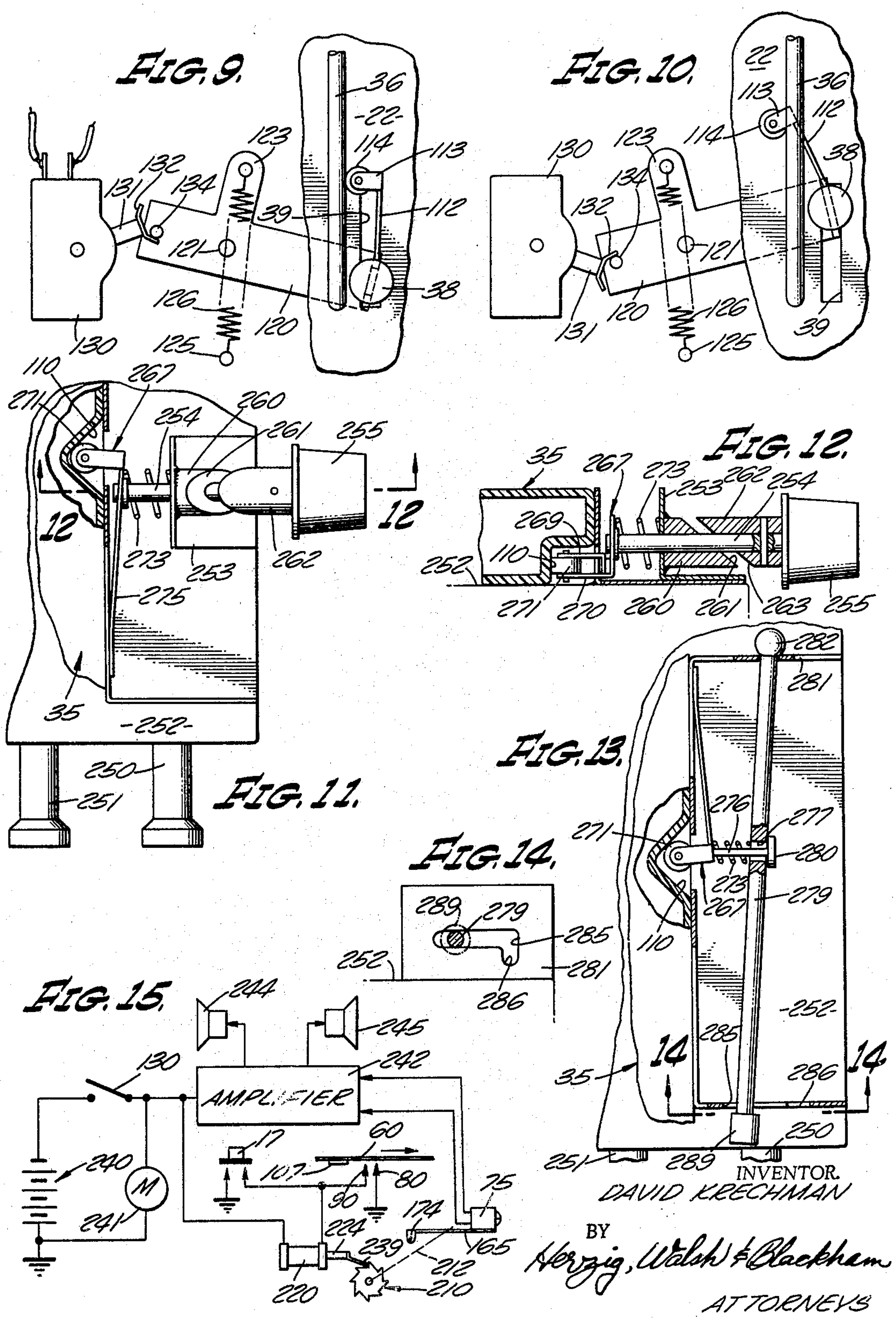
FIGURES 9 and 10 are detail views showing manual actuation of the means for holding the tape cartridge of the type shown in FIGURE 2.
FIGURE 11 is a partial view of a modified form of the invention embodied in a machine having front controls.
FIGURE 12 is a sectional view taken along the line 12—12 of FIGURE 11.
FIGURE 13 is a partial view of a modified form of manual control for holding a tape cartridge in position.
FIGURE 14 is a detail view taken along the line 14—14 of FIGURE 13.
FIGURE 15 is a wiring diagram of the tape player of FIGURES 1, 2 and 3.

The tape cartridge housing 35 has an indentation formed in its side, as shown at 110 in FIGURE 2, which is utilized for purposes of holding the cartridge in inserted position. A preferred form of such spring detent is shown in FIGURES 2, 9 and 10. The lever 38 has an extending spring arm 112 on the end of which is a yoke 113 carrying a roller 114. When the lever 38 is moved to its inward position, as shown in FIGURE 2, with the tape cartridge in position, the spring-urged roller 114 is brought into the indentation 110 so that a spring detent holds the cartridge in its inserted position.

The tape cartridge is also guided, in part, by fingers 116 extending from the frame member 81 which protude into the opening 76 in the end of the tape cartridge in inserted position. To remove the cartridge, lever 38 is simply moved to its outward position in slot 39 and then the cartridge is withdrawn from the machine.

Preferably the manipulation of lever 38 also actuates a switch to turn the tape player on and off. As shown in FIGURES 9 and 10, the lever or knob 38 is connected to operate pivoted lever 120 pivoted on a pivot pin 121. The lever has an extending arm 123 and connected between an end of this arm and a fixed pin 125 is an over center spring 126, so that the movement is with a snap action. Numeral 130 designates a conventional type of snap switch having an operating arm 131 with a yoke 132 at its end cooperable with a pin 134 on the end of lever 120, so that when the operating knob 38 is manipulated, it turns the switch 130 on and off. This switch is diagrammatically shown at 130 in the circuit diagram of 15, which will be described more in detail presently.

Figures 4, 5, 6:
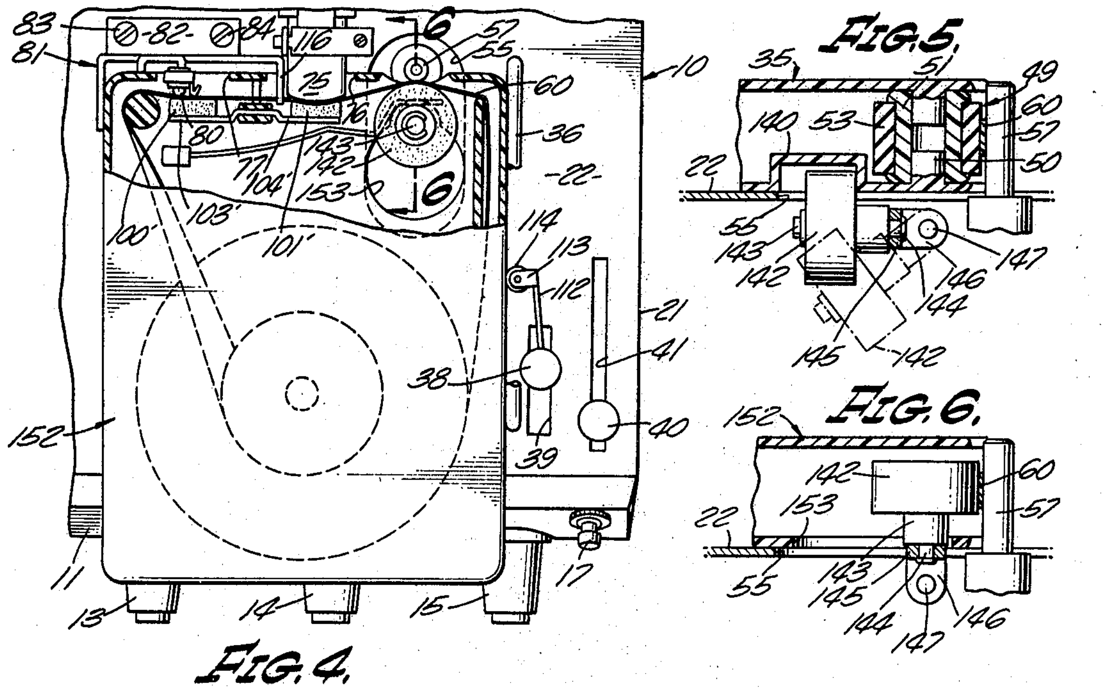
FIGURE 4 is a plan view partly broken away of the machine of FIGURE 1 with another type of tape cartridge inserted in it.
FIGURE 5 is a sectional view taken along the line 5—5 of FIGURE 2.
FIGURE 6 is a sectional view taken along the line 6—6 of FIGURE 4.

FIGURE 5 is a sectional view taken along the line 5—5 of FIGURE 2. It shows the pinch roll 49 in engagement with the capstan 57. The underside of the housing of the cartridge 35 has an indentation formed therein, a part of which is shown in cross-section at 140 in FIGURE 5. The machine, that is the tape player, has its own pinch roll, as designated at 142 in FIGURE 5. It is mounted on a stem or axle 143 which is attached by rivet 144 to a bracket 145. This bracket has an arm 146 mounted on a shaft 147, which shaft is rotatable by means of a connection to the manual lever or knob 40, previously described. The pinch roll 142 can be rotated into a position as shown in FIGURE 5 from the dotted line position, or it can be moved into a position as shown in FIGURE 6 (with another type of tape cartridge) which will be referred to presently. When the tape cartridge of the type shown at 35 is used with the machine, lever 40 is moved part way in its slot, so as to rotate the pinch roll 142 of the machine up into a position, as shown in FIGURE 5, wherein the inner edge of the pinch roll engages a front surface of deformation or indentation 140 so as to assist in holding the tape cartridge 35 in inserted position.

FIGURE 4 is a partial view of the same machine 10, as shown in FIGURES 1 and 2, with the tape cartridge of another type inserted in position in the machine. This tape cartridge is designated at 152. The machine itself is the same. The tape cartridge 152 is generally similar to the tape cartridge 35 with certain specific differences. In the bottom of the housing of the tape cartridge 152 there is a circular opening 153. The pinch roll 142, as shown in FIGURE 6, can be rotated through an opening 155 in the top of the tape player and through the opening 153 to the position, as shown in FIGURE 6, wherein the tape 60 is engaged between this roll and the capstan 57.

The inner corners of the housing of tape cartridge 152 are not bevelled as are those of the cartridge 35. It has similar openings in the inner end wall, as designated at 76 and 77, and the contacts 80 and 91 operate in the same manner. The tape 60 is pressed against the contacts 80 and 91 by a pad 100′ on a flexible arm 103′. The tape is pressed against the electrodes in the end face of the pick-up head 75 by a pad 101′ on the end of an arm 104′. The arms 103′ and 104′ may be integral and supported in a bracket 107 on a stem 108 extending inwardly from the end wall of the cartridge 152.

When the cartridge 152 is used, the lever 40 is operated, as described, to move the pinch roll into position. With this cartridge the lever 38 is not used except that it may be used, if desired, to operate a switch, such as switch 130, turning the machine on and off.

From the foregoing those skilled in the art will observe that the machine, as described, is adapted for utilization with different types of tape cartridges, particularly cartridges which have a pinch roll in them and cartridges which do not.

Next will be described the means adapting the machine for use with magnetic tapes having multiple stereo recordings thereon.

ADJUSTMENT OF PLAY-BACK HEAD

The mounting and adjustment means for the play-back head are shown in FIGURES 2, 7 and 8. The play-back head is mounted on the end of a pivoted lever 165, as shorwn in the figures. At one end, this lever has a pair of ears 166 and 167 which are adjacent to the legs of a yoke member 170, the yoke having legs 171 and 172. The lever is pivoted to the yoke by way of a pivot pin 174 extending through the legs 171 and 172 and the ears 166 and 167. The yoke 170 has extending feet portions or lugs 177 and 178 which are attached to a base frame 180 by screws 181 and 182. The lever 165 can rotate about the pivot shaft 174. It is normally biased by a coil spring 185 surounding the shank 186 of a screw having a head 187 extending through an aperture 188 in lever 165 and threaded into a nut 190 secured to the base frame 180.

The lever 165 has an angular part 195 at its end and formed as a part of the end of the lever is a rectilinear frame 196 which holds and carries the play-back head 75. See FIGURE 7.

The holding frame includes a top member, as shown at 198 in FIGURE 2, which has narrowed end part 199 extending through a slot in an upright part of the frame member, the other end of the top member 198 being secured to an extending ear by a screw 200. Numeral 202 designates a fitting forming part of the play-back head 75 to which the electrical connections 203 are made.

Numeral 210 designates a cam mounted on a vertical axis in a position underneath the lever 165. The cam is relatively flat and is toothed, as shown, so that it forms a ratchet wheel. It has dwells on its upper surface of varying axial extent. Preferably, there are at least four of these dwells providing for four positions of the play-back head relative to the tape, as will be described. In the preferred form, as shown, the cam has eight positions and has two groups of four dwells, the groups being alike. Numeral 212 designates a cam follower in the form of a screw having a head 213. This screw is threaded through a boss 215 on the upper side of lever 165, and its end extends down to engage with the cam 210, there being a head or knob 216 on the end of the screw which engages with the surfaces of the cam 210 and follows them against the biasing action of the spring 185.

The cam 210 is operable in steps by means of a solenoid mechanism including a solenoid winding 220 mounted in brackets 221 and 222 upstanding from openings or cutouts in the supporting base 180. See FIGURES 2 and 8. The solenoid has an armature 224 which is attached to the angular end part 225 of a slide member 226. The opposite end of the slide member 226 is upright, as shown at 228, and bent inwardly, as shown at 229, with an upright end or ear part 230. This end part is attached to a coil spring 231, the other end of which is attached to an upright 232 bent upwardly from the base 180. The slide 226 slides on a support provided by a boss 235 formed upwardly from the base 180. The angular part 225 of slide 226 has an upright portion 236 and attached to this part is a resilient spring pawl 238 having a bent end part 239 engagable with the teeth of the ratchet wheel formed by the cam 210. See FIGURE 2.

As may be seen, each time the solenoid 220 is energized the armature 224 acts through the pawl 238 to advance the ratchet wheel, that is, the cam, one step. As the cam is advanced angularly, the cam follow screw 212 follows cam surfaces that are progressively greater in axial dimension. As the result with each step, the play-back head 75 is raised one increment in position. This brings the electrodes 95 and 96 in the play-back heads progressively into contact with different pairs of magnetic stereo tracks on the tape.

Preferably, the solenoid 220 is controlled by the push button 17 on the face panel of the instrument. This operation is illustrated in the circuit diagram of FIGURE 15 which will now be described. The instrument may be battery powered, the battery being designated at 240. The motor for driving the machine is designated at 241. Numeral 242 designates the amplifier and numerals 244 and 245 designate the stereo speakers which may be separate from the machine itself. The instrument may be turned on by the switch 130 previously described, which energizes the motor 241 and the amplifier 242. The playback 75 may be shifted in position, as described, from one program to another by the metallic coating element 107 on the tape 60 when it bridges its cooperating contacts, as described. This will operate the solenoid 220 in the manner described. The solenoid may also be operated by the manual switch 17, as shown in FIGURE 15.

The tape player as shown in FIGURES 1, 2 and 4 is of a type utilizing a conventional type of manual controls which are the upstanding levers 38 and 40. Other types of machines may have front controls, such as shown in the modification of FIGURES 11 and 12. The machine of this modification is of the type having front controls in the form of a plunger 250 which operates the pinch roll in the machine, and a plunger 251 which operates the switch controlling operation of the machine. These figures show a modified form of control or manipulator for holding a cartridge of the type shown at 35 in inserted position. On the top surface 252 of the machine is a bracket 253. Numeral 254 designates a manual operating stem having a knob 255 on the end thereof. Attached to the bracket 253 is a bushing 260 having a slanting or angular face 261. Attached to the knob 255 is another bushing 262 having a complementary slanting or angular face 263 slanted oppositely and cooperable with the face 261. The stem 254 extends through the bushings and to its end is attached a bracket 267 carrying a yoke having legs 269 and 270 mounting a roller member 271. Between the brackets 253 and 267 is positioned a biasing spring 273 which urges the roller 271 to the left. The yoke is preferably mounted at the end of a leaf spring 275, as shown in FIGURE 11, which assists the spring 273.

In operation, when the knob 255 is turned, the slanting faces 261 and 263 cooperate with each other to cause the stem 254 to move to the right, moving roller 271 out of the indention 110 in the side wall of the cartridge 35. When the knob 25 is released, it is allowed to be moved to the left under the urging of spring 273, so that the roller 271 is moved into the indentation 110 to hold the cartridge 35 in place. FIGURES 11 and 12, as will be observed, provide a side mounted control or manipulator for holding the cartridge in place.

FIGURE 13 shows a form of the invention providing a front mounted control for the mechanism for holding the cartridge in place. Parts which are similar to those of FIGURES 11 and 12 are similarly numbered. Attached to the yoke 267 is a stem 276 which extends through an opening 277 in a lever 279. On the end of the stem 276 is a button 280. The lever 279 has an end part extending through an opening in a bracket 281, there being a knob 282 on the end of this lever. The other end of the lever 279 extends through a slot 285 in the bracket 281, the slot having a downwardly extending leg, as shown at 286 in FIGURE 4. On the end of the lever 279 is a knob 289. The end of the lever 279 is movable to end parts of the slot 285, as shown in FIGURE 14, to bring the roller 271 into and out of the indentation 110 in the side of the cartrideg 35. This, thus, provides a front position for this control or manipulator.

Figures 16, 17, 18:
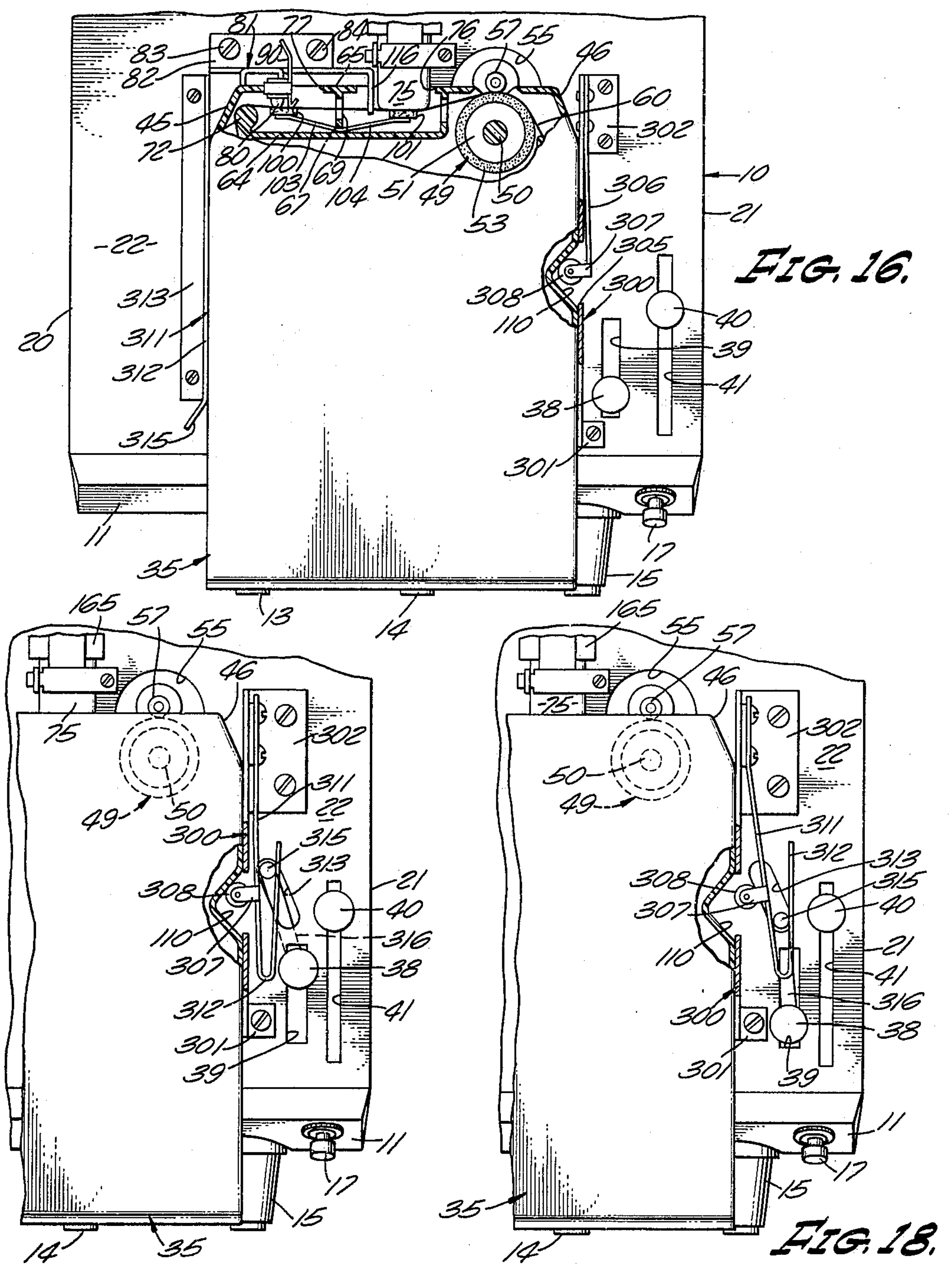
FIGURE 16 is a plan view partly in section of a modified form of machine having a slightly different detent means for holding the tape cartridge.
FIGURES 17 and 18 are partial views of a machine with a further slightly modified form of detent means for holding the tape cartridge.

FIGURE 16 shows a machine which is like that of FIGURES 1 and 2, but which has slightly modified means for holding the tape cartridge 35. This machine may also receive other types of tape cartridges, such as the one shown at 152 in FIGURE 4. Similar parts in FIGURE 16 are numbered similarly to parts in FIGURES 1 and 2. In FIGURE 16 on the top surface of the machine 22 there is provided a side rail 300 having end brackets 301 and 302 attached to the top surface 22 by screws as shown. The guide rail 300 has an opening 305 opposite the indentation 110 in the cartridge 35. Numeral 306 designates a spring attached to the bracket 302 and having a yoke 307 at its end mounting a detent roller 308 which cooperates with the indentation 110 to hold the cartridge in position. The cartridge is held by a guide rail 311 at its opposite side in the form of an angle member having an upright part 312 and a horizontal part 313 attached to the surface 22 by screws as shown. The front end of the upright part 312 is bent outwardly as shown at 315 to facilitate the insertion and guidance of the cartridge into its position in the machine. In this form of the invention the manual lever 38 does not operate the spring detent that holds the tape cartridge. The spring detent operates automatically when the cartridge is inserted and withdrawn.

FIGURES 17 and 18 show another modified form of the invention in which parts corresponding to parts of the previous embodiments are similarly numbered. In this form of the invention guide rails are provided as in FIGURE 16. The detent roller 308 and yoke 307 are mounted on a flexible arm 311 attached to the bracket 302 by screws as shown. One end of this arm is bent, bowed or doubled back as shown at 312. An angularly positioned slot 313 is provided in the top 22 of the machine. Numeral 315 designates a pin moveable in the slot 313 between the flexible arm 311 and the bent back part 312. The pin 315 is in an upstanding position at the end of a link 316 whereby it is linked to the manual operating lever 38. FIGURES 17 and 18 show two positions of the spring detent mechanism for holding the cartridge 35 in place. When the handle or lever 38 is in its inward position as shown in FIGURES 17, the parts are as shown in this figure with the detent roller 308 moved into indentation 110 for holding the cartridge in position. When the lever 38 is moved to its outward position as shown in FIGURE 18 the pin 315 moves outwardly in the space between arm 311 and the bent back part 312 so that the arm 311 is bent or moved outwardly into the position as shown in FIGURE 18 with the detent roller 308 moved outwardly to disengage from the cartridge 35 and allow it to be removed.

From the foregoing those skilled in the art will observe that various mechanical arrangements may be provided for latching or removeably holding the cartridge in place when inserted in the machine.

From the foregoing, those skilled in the art will observe that the invention, as described herein, achieves and realizes all of the objects and advantages of the invention as outlined in the foregoing, as well as having many additional advantages that are apparent from the detailed description. The improvements of the invention provide for adapting the instrument, such as a tape player, to the various types of cartridges commercially available, and thereby greatly increases the usefulness and versatility of the machine. The owner can use any of the available tape cartridges without having to have more than one machine for different cartridges. The mechanism for accomplishing these purposes is simplified, but very positive and easy to use.

The improvements of the invention further provide for adapting the single machine to use with tapes having a plurality of programs recorded thereon. Some cartridges may have tapes with only two programs recorded thereon, whereas other tapes may have four or more programs recorded thereon. The improvements of the invention adapt the machine for use with any of these tapes and make it possible to shift from one recording or program to another simply by pressing a button. The user thus has a much wider choice of tape cartridges that may be purchased and all used with a single machine.

The foregoing disclosure is representative of preferred forms of the invention and is to be interpreted in an illustrative rather than a limiting sense, the invention to be accorded the full scope of the claims appended hereto.

What is claimed is:

1. A reproducing machine of the type using magnetic tape adapted for receiving tape cartridges containing a pinch roll and also cartridges not having a pinch roll, in combination, a chassis, said chassis having a pinch roll movable through an opening in a tape cartridge to engage a magnetic tape therein for holding the tape in engagement with a capstan in the machine, the chassis having means configurated to receive a tape cartridge in a position adjacent to a magnetic head, in a position wherein the pinch roll can be moved to hold the magnetic tape against the capstan, and said chassis being configurated to receive and to retain a tape cartridge having a pinch roll mounted in it in a position in which the said last pinch roll holds the magnetic tape engaged between the pinch roll and the capstan of the machine, and means whereby the pinch roller in the machine is movable into a position to engage the said tape cartridge to assist in holding it in position in the machine.

2. A machine as in claim 1 wherein said holding means comprises an abutment into engagement with which a part of the pinch roller in the machine can be moved with the pinch roller holding the tape cartridge in position.

References Cited

UNITED STATES PATENTS

| | | | |
|---|---|---|---|
| 2,424,697 | 7/1947 | Lear | 179—100.2 |
| 2,438,222 | 3/1948 | Lear | 179—100.2 |
| 2,876,005 | 3/1959 | Eash | 271—2 |
| 3,023,943 | 3/1962 | Schober | 226—181 |
| 3,243,134 | 3/1966 | Reed et al. | 242—55.19 |

BERNARD KONICK, Primary Examiner

ROBERT S. TUPPER, Assistant Examiner

U.S. Cl. X.R.

179—100.2; 226—181